(12) United States Patent
Tanaka

(10) Patent No.: US 7,715,113 B2
(45) Date of Patent: May 11, 2010

(54) ZOOM LENS AND IMAGING APPARATUS

(75) Inventor: Takashi Tanaka, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/267,221

(22) Filed: Nov. 7, 2008

(65) Prior Publication Data

US 2009/0128925 A1    May 21, 2009

(30) Foreign Application Priority Data

Nov. 15, 2007    (JP) .......................... P2007-296388

(51) Int. Cl.
*G02B 15/14* (2006.01)
(52) U.S. Cl. ...................................... 359/687; 359/686
(58) Field of Classification Search .................. 359/687, 359/686, 676; 396/72–88; 348/240.99–240.3, 348/335–369
See application file for complete search history.

(56) References Cited

U.S. PATENT DOCUMENTS

| 5,189,558 | A | 2/1993 | Ishii et al. |
| 5,396,367 | A | 3/1995 | Ono et al. |
| 2005/0168833 | A1* | 8/2005 | Horiuchi ..................... 359/687 |
| 2005/0254138 | A1 | 11/2005 | Yoneyama |

FOREIGN PATENT DOCUMENTS

| JP | 4-43311 A | 2/1992 |
| JP | 5-297275 A | 11/1993 |
| JP | 8-304700 A | 11/1996 |
| JP | 2001-91830 A | 4/2001 |
| JP | 2001-228395 A | 8/2001 |
| JP | 2002-131638 A | 5/2002 |
| JP | 2005-326516 A | 11/2005 |

* cited by examiner

*Primary Examiner*—Darryl J Collins
(74) *Attorney, Agent, or Firm*—Birch, Stewart, Kolasch & Birch, LLP

(57) ABSTRACT

A fourth lens group of a four-lens group zoom lens includes, in order from an object side, a single positive lens having aspheric surfaces on both sides, and a cemented lens formed of a negative lens and a positive meniscus lens having a convex surface directed to the object side. The object-side surface of the positive single lens is convex and has a stronger refractive power. The cemented lens has a negative refractive power as a whole. The following conditional expressions are satisfied:

$0.04 < Da/f4 < 0.15$ $(n_{41}+n_{43})/2 < 1.53$ where Da denotes a gap between the single positive lens and the cemented lens,
f4 denotes a focal length of the fourth lens group,
$n_{41}$ denotes a refractive index of the single positive lens at the d-line, and
$n_{43}$ denotes a refractive index of the positive meniscus lens at the d-line.

16 Claims, 15 Drawing Sheets

FIG. 4A

| | EXAMPLE 1 BASIC LENS DATA | | | | |
|---|---|---|---|---|---|
| | Si (SURFACE NUMBER) | Ri (CURVATURE RADIUS) | Di (SURFACE SPACING) | ndj (REFRACTIVE INDEX) | νdj (ABBE NUMBER) |
| G1 | 1 | 41.144 | 0.95 | 1.84660 | 23.9 |
| | 2 | 19.426 | 4.61 | 1.62041 | 60.3 |
| | 3 | −389.705 | 0.10 | | |
| | 4 | 19.056 | 2.81 | 1.77250 | 49.6 |
| | 5 | 65.968 | D5 (VARIABLE) | | |
| G2 | 6 | 140.812 | 0.62 | 1.88299 | 40.7 |
| | 7 | 5.373 | 2.39 | | |
| | 8 | −16.118 | 0.62 | 1.83480 | 42.7 |
| | 9 | 25.276 | 0.20 | | |
| | 10 | 11.350 | 2.65 | 1.84660 | 23.9 |
| | 11 | −11.350 | 0.60 | 1.88299 | 40.7 |
| | 12 | 57.402 | D12 (VARIABLE) | | |
| | 13 | (AD) | 0.85 | | |
| G3 | *14 | 7.177 | 3.25 | 1.51560 ($n_{3P}$) | 63.1 |
| | 15 | −249.969 | 0.50 | | |
| | 16 | 9.318 | 0.65 | 1.92285 ($n_{3N}$) | 18.9 ($\nu_{3N}$) |
| | 17 | 6.697 | D17 (VARIABLE) | | |
| G4 | *18 | 7.203 | 3.75 | 1.47136 ($n_{41}$) | 76.6 ($\nu_{41}$) |
| | *19 | −12.673 | 1.54 (Da) | | |
| | 20 | 91.752 | 0.60 | 1.83400 | 37.1 |
| | 21 | 6.576 | 2.13 | 1.51742 ($n_{43}$) | 52.1 |
| | 22 | 31.839 | D22 (VARIABLE) | | |
| DG | 23 | ∞ | 3.18 | 1.51680 | 64.2 |
| | 24 | ∞ | | | |

(*: ASPHERIC SURFACE, AD: APERTURE DIAPHRAGM)
(f=4.64∼14.38∼44.52mm, $F_{NO}$=1.85∼2.23∼2.40,
2ω=64.19°∼21.11°∼6.83°)

FIG. 4B

| EXAMPLE 1 VARIABLE SURFACE SPACING DATA | | | |
|---|---|---|---|
| SURFACE NUMBER | WIDE-ANGLE END | INTERMEDIATE | TELEPHOTO END |
| D5 | 0.60 | 8.90 | 14.85 |
| D12 | 16.79 | 8.49 | 2.54 |
| D17 | 6.31 | 2.99 | 5.49 |
| D22 | 3.26 | 6.58 | 4.08 |

FIG. 5

| EXAMPLE 1 ASPHERIC SURFACE DATA ||||
|---|---|---|---|
| ASPHERIC SURFACE COEFFICIENT | SURFACE NUMBER |||
| | 14TH SURFACE | 18TH SURFACE | 19TH SURFACE |
| K | 1.00000 | 0.21599 | −3.21432 |
| A3 | −1.18059E−06 | −1.37030E−04 | −2.63142E−04 |
| A4 | −2.49077E−04 | −1.55579E−05 | 4.23261E−04 |
| A5 | −1.28683E−05 | 2.25088E−05 | −1.18804E−05 |
| A6 | −1.30058E−06 | 3.38217E−08 | −6.13074E−07 |
| A7 | −1.18851E−07 | −5.89717E−08 | 8.45642E−07 |
| A8 | −1.41561E−08 | 9.63395E−08 | 2.08678E−07 |
| A9 | −3.16785E−09 | 4.01377E−08 | 4.24810E−08 |
| A10 | −5.70432E−10 | 5.97763E−09 | 4.80724E−09 |
| A11 | −8.11106E−11 | 6.27160E−10 | −9.52642E−10 |
| A12 | −8.05205E−12 | −2.11351E−10 | −2.61740E−10 |
| A13 | −5.85424E−14 | −5.23163E−11 | −5.90987E−11 |
| A14 | 1.74732E−13 | −1.09043E−11 | −2.66591E−11 |
| A15 | 3.45297E−14 | 2.17150E−12 | 4.19993E−12 |
| A16 | −1.37871E−15 | 1.10062E−12 | 3.27092E−12 |

FIG. 6A

| | EXAMPLE 2 BASIC LENS DATA | | | |
|---|---|---|---|---|
| Si (SURFACE NUMBER) | Ri (CURVATURE RADIUS) | Di (SURFACE SPACING) | ndj (REFRACTIVE INDEX) | νdj (ABBE NUMBER) |
| G1 { 1 | 40.576 | 0.95 | 1.84660 | 23.9 |
| 2 | 19.522 | 4.65 | 1.62041 | 60.3 |
| 3 | -265.107 | 0.10 | | |
| 4 | 18.163 | 2.87 | 1.75500 | 52.3 |
| 5 | 59.028 | D5 (VARIABLE) | | |
| G2 { 6 | 176.620 | 0.62 | 1.88299 | 40.7 |
| 7 | 5.287 | 2.33 | | |
| 8 | -16.063 | 0.62 | 1.83480 | 42.7 |
| 9 | 25.108 | 0.20 | | |
| 10 | 11.085 | 2.62 | 1.84660 | 23.9 |
| 11 | -11.085 | 0.60 | 1.88299 | 40.7 |
| 12 | 50.850 | D12(VARIABLE) | | |
| 13 | (AD) | 0.85 | | |
| G3 { *14 | 6.996 | 3.20 | 1.51530 ($n_{3P}$) | 62.8 |
| 15 | ∞ | 0.27 | | |
| 16 | 8.840 | 0.65 | 1.92285 ($n_{3N}$) | 18.9 ($\nu_{3N}$) |
| 17 | 6.447 | D17(VARIABLE) | | |
| G4 { *18 | 7.167 | 3.76 | 1.47136 ($n_{41}$) | 76.6 ($\nu_{41}$) |
| *19 | -13.061 | 1.75 (Da) | | |
| 20 | -556.718 | 0.60 | 1.83400 | 37.1 |
| 21 | 7.272 | 2.11 | 1.51823 ($n_{43}$) | 58.9 |
| 22 | 81.339 | D22(VARIABLE) | | |
| DG { 23 | ∞ | 3.18 | 1.51680 | 64.2 |
| 24 | ∞ | | | |

(*: ASPHERIC SURFACE, AD: APERTURE DIAPHRAGM)
($f$=4.65∼14.42∼44.66mm, $F_{NO}$=1.85∼2.22∼2.40,
$2\omega$=64.11° ∼21.11° ∼6.81° )

FIG. 6B

| EXAMPLE 2 VARIABLE SURFACE SPACING DATA | | | |
|---|---|---|---|
| SURFACE NUMBER | WIDE-ANGLE END | INTERMEDIATE | TELEPHOTO END |
| D5 | 0.62 | 8.61 | 14.37 |
| D12 | 16.24 | 8.25 | 2.49 |
| D17 | 6.09 | 2.85 | 5.76 |
| D22 | 3.22 | 6.45 | 3.55 |

FIG. 7

| ASPHERIC SURFACE COEFFICIENT | EXAMPLE 2 ASPHERIC SURFACE DATA | | |
|---|---|---|---|
| | SURFACE NUMBER | | |
| | 14TH SURFACE | 18TH SURFACE | 19TH SURFACE |
| K | 1.00000 | 0.34715 | −2.64842 |
| A3 | −3.74228E−05 | −1.37376E−04 | −2.52595E−04 |
| A4 | −2.28654E−04 | −9.20228E−06 | 5.16451E−04 |
| A5 | −2.08897E−05 | 2.90658E−05 | 6.69230E−06 |
| A6 | −1.60451E−06 | 2.45104E−06 | 1.63383E−07 |
| A7 | −9.14718E−08 | 2.14542E−07 | 9.31046E−07 |
| A8 | −2.94526E−09 | 1.04427E−07 | 3.03778E−07 |
| A9 | −6.60745E−10 | 2.91573E−08 | 4.84784E−08 |
| A10 | −3.55465E−10 | 5.78370E−09 | 6.40701E−09 |
| A11 | −1.19034E−10 | 9.38321E−10 | −5.87995E−10 |
| A12 | −2.91035E−11 | 8.22466E−12 | −3.83639E−10 |
| A13 | −5.44632E−12 | −1.68988E−11 | −7.35153E−11 |
| A14 | −6.65826E−13 | −4.21174E−12 | 4.53202E−12 |
| A15 | 3.02669E−14 | 8.37800E−13 | 7.56373E−12 |
| A16 | 5.62585E−14 | 1.07152E−12 | 3.71293E−12 |

FIG. 8A

| | EXAMPLE 3 BASIC LENS DATA | | | | |
|---|---|---|---|---|---|
| | Si (SURFACE NUMBER) | Ri (CURVATURE RADIUS) | Di (SURFACE SPACING) | ndj (REFRACTIVE INDEX) | νdj (ABBE NUMBER) |
| G1 | 1 | 42.089 | 1.00 | 1.84660 | 23.9 |
| | 2 | 19.633 | 4.82 | 1.62041 | 60.3 |
| | 3 | -448.683 | 0.10 | | |
| | 4 | 19.579 | 2.95 | 1.77250 | 49.6 |
| | 5 | 70.858 | D5 (VARIABLE) | | |
| G2 | 6 | 174.268 | 0.62 | 1.88299 | 40.7 |
| | 7 | 5.408 | 2.37 | | |
| | 8 | -15.445 | 0.62 | 1.83480 | 42.7 |
| | 9 | 26.801 | 0.20 | | |
| | 10 | 11.475 | 2.63 | 1.84660 | 23.9 |
| | 11 | -10.818 | 0.60 | 1.88299 | 40.7 |
| | 12 | 55.080 | D12(VARIABLE) | | |
| | 13 | (AD) | 0.85 | | |
| G3 | *14 | 7.433 | 3.19 | 1.51560 ($n_{3P}$) | 63.1 |
| | 15 | -113.339 | 0.50 | | |
| | 16 | 9.676 | 0.65 | 1.92285 ($n_{3N}$) | 18.9 ($\nu_{3N}$) |
| | 17 | 7.079 | D17(VARIABLE) | | |
| G4 | *18 | 6.980 | 3.80 | 1.47136 ($n_{41}$) | 76.6 ($\nu_{41}$) |
| | *19 | -12.266 | 1.05 (Da) | | |
| | 20 | 54.871 | 0.60 | 1.83400 | 37.1 |
| | 21 | 5.760 | 2.29 | 1.51741 ($n_{43}$) | 52.4 |
| | 22 | 24.545 | D22(VARIABLE) | | |
| DG | 23 | ∞ | 3.18 | 1.51680 | 64.2 |
| | 24 | ∞ | | | |

(*: ASPHERIC SURFACE, AD: APERTURE DIAPHRAGM)
(f=4.50~13.96~43.22mm, F$_{NO}$=1.85~2.23~2.24,
2ω=65.88° ~21.67° ~7.04° )

FIG. 8B

| EXAMPLE 3 VARIABLE SURFACE SPACING DATA | | | |
|---|---|---|---|
| SURFACE NUMBER | WIDE-ANGLE END | INTERMEDIATE | TELEPHOTO END |
| D5 | 0.60 | 9.06 | 14.97 |
| D12 | 16.91 | 8.45 | 2.54 |
| D17 | 6.82 | 3.31 | 4.61 |
| D22 | 3.25 | 6.76 | 5.46 |

FIG. 9

| ASPHERIC SURFACE COEFFICIENT | EXAMPLE 3 ASPHERIC SURFACE DATA | | |
|---|---|---|---|
| | SURFACE NUMBER | | |
| | 14TH SURFACE | 18TH SURFACE | 19TH SURFACE |
| K | 1.00000 | -0.18545 | -3.77731 |
| A3 | -9.82748E-05 | -1.76002E-06 | -1.10664E-04 |
| A4 | -1.69322E-04 | -4.98930E-06 | 2.46203E-04 |
| A5 | -1.99477E-05 | 2.54490E-05 | 9.80803E-06 |
| A6 | -2.31001E-06 | 3.85633E-06 | -1.39397E-07 |
| A7 | -1.78021E-07 | 2.14617E-07 | 1.46278E-07 |
| A8 | 4.72387E-09 | -3.25166E-08 | 1.03515E-07 |
| A9 | 3.40568E-09 | -1.16029E-08 | 2.34850E-08 |
| A10 | 6.10362E-10 | -1.33130E-09 | 3.94179E-09 |
| A11 | 2.59739E-11 | 7.06307E-11 | 3.43900E-12 |
| A12 | -1.66452E-11 | 1.40258E-10 | -1.26345E-10 |
| A13 | -6.00020E-12 | 3.37186E-11 | -4.49533E-11 |
| A14 | -1.12441E-12 | 6.96373E-12 | -7.85602E-12 |
| A15 | -6.43003E-14 | 1.29325E-12 | 1.19346E-12 |
| A16 | 4.82470E-14 | -3.59168E-14 | 1.76248E-12 |

FIG. 10

VALUES RELATING TO CONDITIONAL EXPRESSIONS

| CONDITIONAL EXPRESSION | EXPRESSION NUMBER | EXAMPLE 1 | EXAMPLE 2 | EXAMPLE 3 |
|---|---|---|---|---|
| $0.04 < Da/f4 < 0.15$ | (1) | 0.096 | 0.112 | 0.063 |
| $(n_{41}+n_{43})/2 < 1.53$ | (2) | 1.494 | 1.495 | 1.494 |
| $\nu_{41} > 70$ | (3) | 76.6 | 76.6 | 76.6 |
| $n_{3N}-n_{3P} > 0.38$ | (4) | 0.407 | 0.408 | 0.407 |
| $\nu_{3N} < 21$ | (5) | 18.9 | 18.9 | 18.9 |
| $-1.2 < fw/f2 < -0.85$ | (6) | -0.917 | -0.945 | -0.904 |

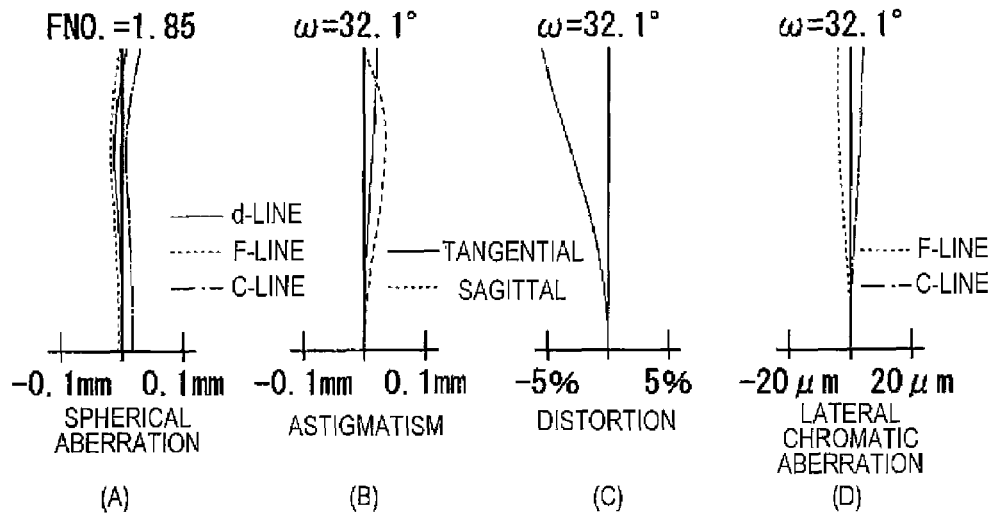
FIG. 11 EXAMPLE 1 (WIDE-ANGLE END)
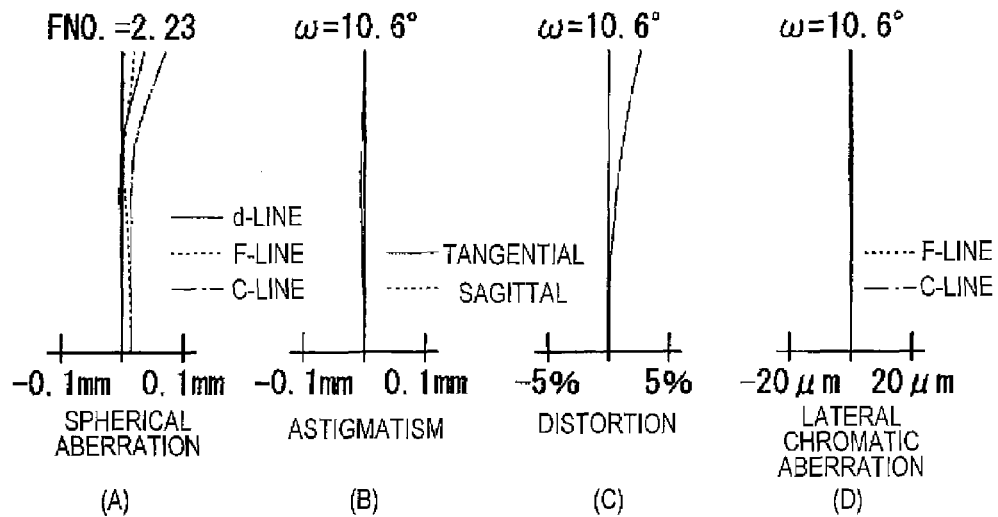
FIG. 12 EXAMPLE 1 (INTERMEDIATE)

EXAMPLE 2 (INTERMEDIATE)

EXAMPLE 2 (TELEPHOTO END)

EXAMPLE 3 (TELEPHOTO END)

ZOOM LENS AND IMAGING APPARATUS

CROSS-REFERENCE TO RELATED APPLICATIONS

This application is based upon and claims the benefit of priority from the Japanese Patent Application No. 2007-296388 filed on Nov. 15, 2007; the entire contents of which are incorporated herein by reference.

BACKGROUND OF THE INVENTION

1. Technical Field

The invention relates to a zoom lens suitable for, for example, a video camera and a digital still camera, and relates to an imaging apparatus including the zoom lens.

2. Description of the Related Art

In recent years, a rear focus type zoom lens has been generally used as a zoom lens for a video camera. The rear focus type zoom lens includes four lens groups having positive, negative, positive, and positive refractive powers in order from an object side, and the fourth lens group is used for focusing. There is an increasing demand for a video camera is not only compact and lightweight but also has a high performance, with an improvement in the image quality of high definition television monitors and with an increase in the screen size of high definition television monitors. Also, there is a demand for a video camera capable of capturing an image at a wide angle in a small space, such as in a room. Therefore, it is necessary to achieve a zoom lens having a large angle of view at a wide-angle end and a high zoom ratio.

There are some methods to achieve a size reduction of the four-group zoom lens having positive, negative, positive, and positive refractive powers, while maintaining a high performance. First, a movement of a second lens group in an optical axis direction may be reduced in order to increase a negative refractive power of the second lens group to ensure a predetermined zoom ratio. To this end, it is preferable that the second lens group include four or more lenses. In particular, when the second lens group consists of four lenses, it is preferable that the second lens group consists of, in order from the object side, a negative lens having a concave surface which has a strong refractive power and is directed to the image side, a negative lens having concave surfaces on both sides, and a cemented lens formed of a positive lens having convex surfaces on both sides and a negative lens (see JP 2001-91830 A and JP 2001-228395 A).

Also, the third lens group may be formed of a so-called telephoto type which includes two lenses having a positive refractive power and a negative refractive power in order from the object side, and the principal position of the third lens group may be moved to the object side to shorten a distance from the third lens group to an image formation surface. To this end, it is preferable that the third lens group include two or more lenses. In particular, when the third lens group consists of two lenses, it is preferable that the third lens group consists of, in order from the object side, a positive lens having a convex surface, which has a stronger refractive power and is directed to the object side, and a negative meniscus lens which has a concave surface, which has a stronger refractive power and is directed to the image side, (see JP Hei.4-43311 A (corresponding to U.S. Pat. No. 5,189,558), JP Hei.5-297275 A (corresponding to U.S. Pat. No. 5,396, 367) and JP Hei.8-304700 A).

Further, the fourth lens group may be formed of a telephoto type, and the principal position of the fourth lens group may be moved to the object side to shorten a distance from the fourth lens group to the image formation surface. To this end, it is preferable that the fourth lens group include three or more lenses. In particular, when the fourth lens group consists of three lenses, it is preferable that the fourth lens group consists oft in order from the object side, a positive lens, and a cemented lens, which has a negative refractive power and is formed of a negative lens and a positive lens (see JP 2005-326516 A (corresponding to US 2005/0254138 A)).

However, although the second lens group of the zoom lens disclosed JP 2001-91830 A has the above-mentioned preferable structure, the fourth lens group consists of two lenses. Therefore, there is a limit to achieve a high-performance optical system. Also, S although the second lens group of the zoom lens disclosed in JP 2001-228395 A has the above-mentioned preferable structure, the third lens group consists of one lens. Therefore, it is difficult to shorten the overall length of the zoom lens, and it is difficult to achieve a high-performance optical system. Further, since a negative lens is disposed on the object side of the fourth lens group, a back focal length is long, and it is difficult to shorten the overall length of the zoom lens.

In the zoom lenses disclosed in JP Hei.4-43311 A (corresponding to U.S. Pat. No. 5,189,558), JP Hei.5-297275 A (corresponding to U.S. Pat. No. 5,396,367) and JP Hei.8-304700 A, the third lens group has the above-mentioned preferable structure. However, the second lens group consists of three lenses. Therefore, when the refractive power is increased to shorten the overall length of the zoom lens, the negative Petzval sum is increased, and a large image plane variation is caused by zooming. In addition, since the fourth lens group consists of one or two lenses and is not a telephoto type, it is difficult not only to achieve a high-performance optical system but also to shorten the overall length of the zoom lens.

Further, in the zoom lens disclosed in JP 2005-326516 A (corresponding to US 2005/0254138 A), the fourth lens group has the above-mentioned preferable structure. However, a good balance between the size reduction of the zoom lens and the improvement of the performance thereof is not achieved. Therefore, it is necessary to optimize the structure of the zoom lens. In particular, an air gap between two lens elements in the fourth lens group is large, and the overall length of the fourth lens group is long. Therefore, when considering the movement of the zoom lens during zooming and during focusing, a large space is required between the third lens group and the image formation surface.

SUMMARY OF THE INVENTION

In view of the above circumstances, the invention has been made and provides a four-group zoom lens has positive, negative, positive, and positive refractive powers in order from an object side, has a large angle of view (for example, about 65°) at a wide-angle end, a high zoom ratio (for example, a zoom power of 10), a small size, and a high optical performance, and is suitable for, for example, a video camera and a digital still camera, and provides an imaging apparatus that includes the zoom lens and is capable of obtaining a high-quality image.

According to an aspect of the invention, a zoom lens includes, in order from an object side, a first lens group having a positive refractive power, a second lens group having a negative refractive power, a third lens group having a positive refractive power, and a fourth lens group having a positive refractive power. The first lens group and the third lens group are fixed during zooming. The second lens group is moved during the zooming. The fourth lens group is moved during zooming and during focusing. The fourth lens group includes, in order from the object side, a single positive lens and a cemented lens. The single positive lens has aspheric surfaces on both of the object side and an image side. The object-side surface of the single positive lens is convex and has a refractive power stronger than that of the image-side surface of the single positive lens. The cemented lens has a negative refractive power as a whole. The cemented lens is formed of a negative lens and a positive meniscus lens that has a convex surface directed to the object side. The following conditional expressions are satisfied:

$$0.04 < Da/f4 < 0.15 \quad (1)$$

$$(n_{41}+n_{43})/2 < 1.53 \quad (2)$$

where Da denotes a gap between the single positive lens and the cemented lens in the fourth lens group, f4 denotes a focal length of the fourth lens group, $n_{41}$ denotes a refractive index of the single positive lens in the fourth lens group at the d-line, and $n_{43}$ denotes a refractive index of the positive meniscus lens in the fourth lens group at the d-line.

The zoom lens includes the four lens groups having positive, negative, positive, and positive refractive powers. The fourth lens group includes the single positive lens and the cemented lens. The single positive lens has the aspheric surfaces on both of the object side and the image side. The object-side surface of the single positive lens is convex and has the refractive power stronger than that of the image-side surface of the single positive lens. The cemented lens has the negative refractive power as a whole. The cemented lens is formed of the negative lens and the positive meniscus lens that has the convex surface directed to the object side. In addition, the fourth lens group satisfies the predetermined conditional expressions to have an optimal structure. Therefore, the fourth lens group becomes a moderate telephoto type. Further, since the principal position of the fourth lens group is moved to the object side, it is possible to shorten a distance between the fourth lens group and an image formation surface while ensuring a necessary back focal length. Therefore, it is possible to achieve both of a zoom lens having a small size and a high performance.

Furthermore, if some of the following preferable conditions are employed and satisfied appropriately, it is possible to easily achieve the object of the invention.

In the zoom lens, the single positive lens in the fourth lens group may satisfy the following conditional expression:

$$v_{41} > 70 \quad (3)$$

where $v_{41}$ denotes an Abbe number of the single positive lens in the fourth lens group at the d-line.

Also, the third lens group may include, in order from the object side, a positive lens having at least one aspheric surface and a negative meniscus lens. An object-side surface of the positive lens is convex and has a refractive power stronger than that of an image-side surface of the positive lens. The negative meniscus lens has a concave surface directed to the image side. The third lens group may satisfy the following conditional expression:

$$n_{3N}-n_{3P} > 0.38 \quad (4)$$

$$v_{3N} < 21 \quad (5)$$

where $n_{3N}$ denotes a refractive index of the negative meniscus lens in the third lens group at the d-line, $n_{3P}$ denotes a refractive index of the positive lens in the third lens group at the d-line, and $v_{3N}$ denotes an Abbe number of the negative meniscus lens in the third lens group at the d-line.

Also, the second lens group may include in order from the object side, a negative lens, a negative lens having concave surfaces on both sides and a cemented lens. An image-side surface of the negative lens is a concave surface and has a refractive power stronger than that of an object-side surface of the negative lens. The cemented lens is formed of a positive lens having convex surfaces on both sides and a negative lens. The following conditional expression may be further satisfied:

$$-1.2 < fw/f2 < -0.85 \quad (6)$$

where fw denotes a focal length of the entire optical system at the wide-angle end, and f2 denotes a focal length of the second lens group.

According to another aspect of the invention, an imaging apparatus includes the zoom lens set forth above and an imaging device that outputs imaging signals in accordance with an optical image formed by the zoom lens.

The imaging apparatus can obtain high-resolution imaging signals based on a high-resolution optical image obtained by the zoom lens, and obtain a high-quality image based on the imaging signals.

With the above structure, the zoom lens includes the four lens groups having positive, negative, positive, and positive refractive powers. The fourth lens group includes the single positive lens and the cemented lens. The single positive lens has the aspheric surfaces on both of the object side and the image side. The object-side surface of the single positive lens is convex and has the refractive power stronger than that of the image-side surface of the single positive lens. The cemented lens has the negative refractive power as a whole. The cemented lens is formed of the negative lens and the positive meniscus lens that has the convex surface directed to the object side. In addition, the fourth lens group satisfies the predetermined conditional expressions to have an optimal structure. Therefore, the fourth lens group becomes a moderate telephoto type. Further, since the principal position of the fourth lens group is moved to the object side, it is possible to shorten a distance between the fourth lens group and an image formation surface while ensuring a necessary back focal length. Therefore, it is possible to achieve both of a zoom lens having a small size and a high performance. Thereby, it is possible to achieve a zoom lens that has a large angle of view at a wide-angle end, a high zoom ratio, a small size, and a high optical performance and is suitable for, for example, a video camera and a digital still camera.

Further, with the imaging apparatus set forth above, it is possible to output imaging signals in accordance with the optical image formed by the high-performance zoom lens. Therefore, it is possible to obtain a high-quality image.

BRIEF DESCRIPTION OF THE DRAWINGS

FIGS. 4A and 4B are diagrams illustrating lens data of the zoom lens according to Example 1. FIG. 4A shows basic lens data, and FIG. 4B shows data of a surface spacing of a portion that is moved along with zooming.

FIG. 5 is a diagram illustrating data relating to an aspheric surface of the zoom lens according to Example 1.

FIGS. 6A and 6B are diagrams illustrating lens data of the zoom lens according to Example 2. FIG. 6A shows basic lens data, and FIG. 6B shows data of a surface spacing of a portion that is moved along with zooming.

FIG. 7 is a diagram illustrating data relating to an aspheric surface of the zoom lens according to Example 2.

FIGS. 8A and 8B are diagrams illustrating lens data of the zoom lens according to Example 3. FIG. 8A shows basic lens data, and FIG. 8B shows data of a surface spacing of a portion that is moved along with zooming.

FIG. 9 is a diagram illustrating data relating to an aspheric surface of the zoom lens according to Example 3.

FIG. 10 is a diagram illustrating values of Examples relating to conditional expressions.

FIG. 11 is an aberration diagram illustrating spherical aberration, astigmatism, distortion, and lateral chromatic aberration of the zoom lens according to Example 1 at a wide-angle end, in which (A) shows the spherical aberration, (B) shows the astigmatism, (C) shows the distortion, and (D) shows the lateral chromatic aberration.

FIG. 12 is an aberration diagram illustrating spherical aberration, astigmatism, distortion, and lateral chromatic aberration of the zoom lens according to Example 1 at an intermediate focal length, in which (A) shows the spherical aberration, (B) shows the astigmatism, (C) shows the distortion, and (D) shows the lateral chromatic aberration.

DETAILED DESCRIPTION OF EMBODIMENTS OF THE INVENTION

Hereinafter, exemplary embodiments of the invention will be described in detail with reference to the accompanying drawings.

Figure 1:
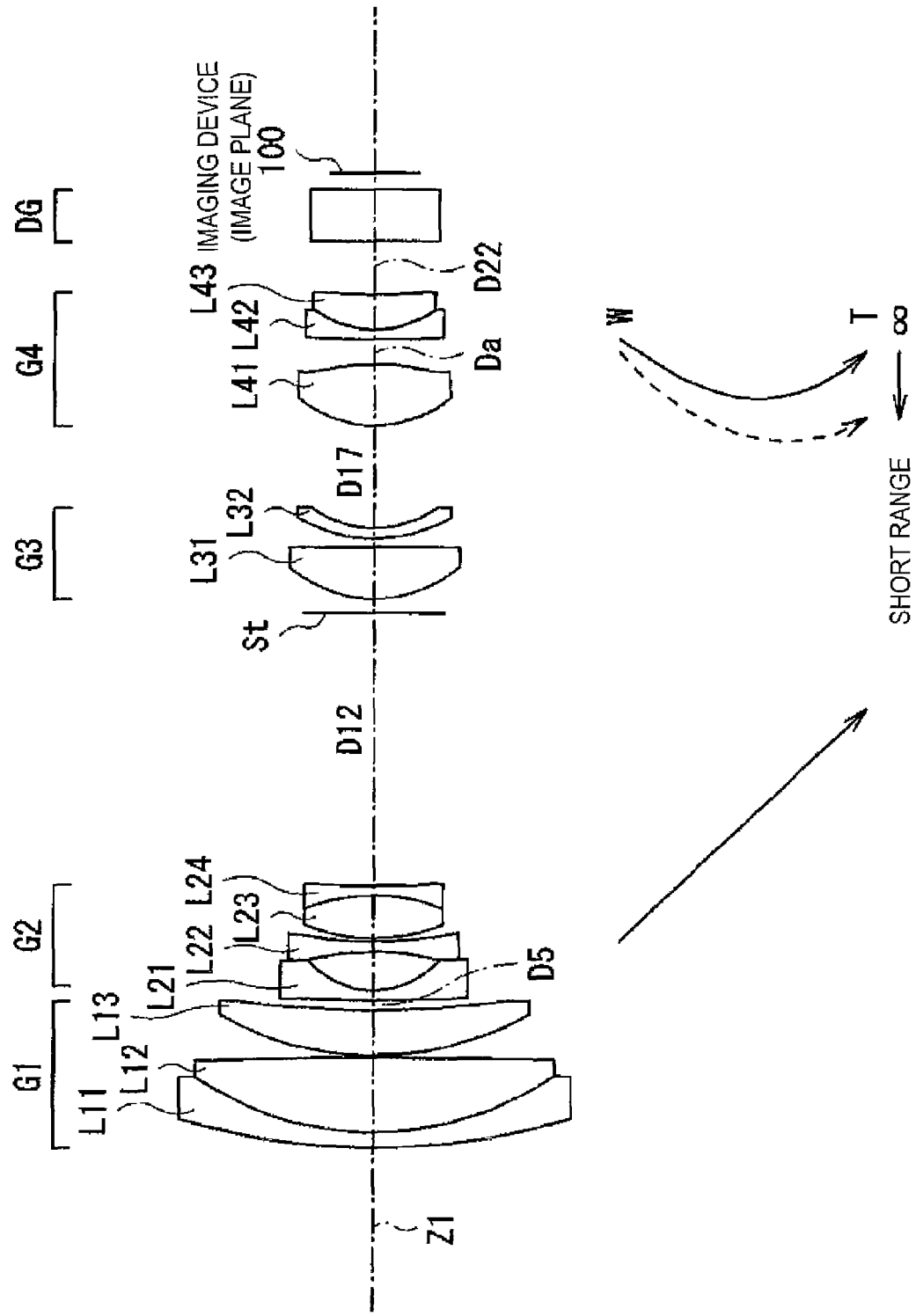
FIG. 1 is a section view illustrating a first example of the structure of a zoom lens according to an embodiment of the invention, which corresponds to Example 1.
Figure 2:
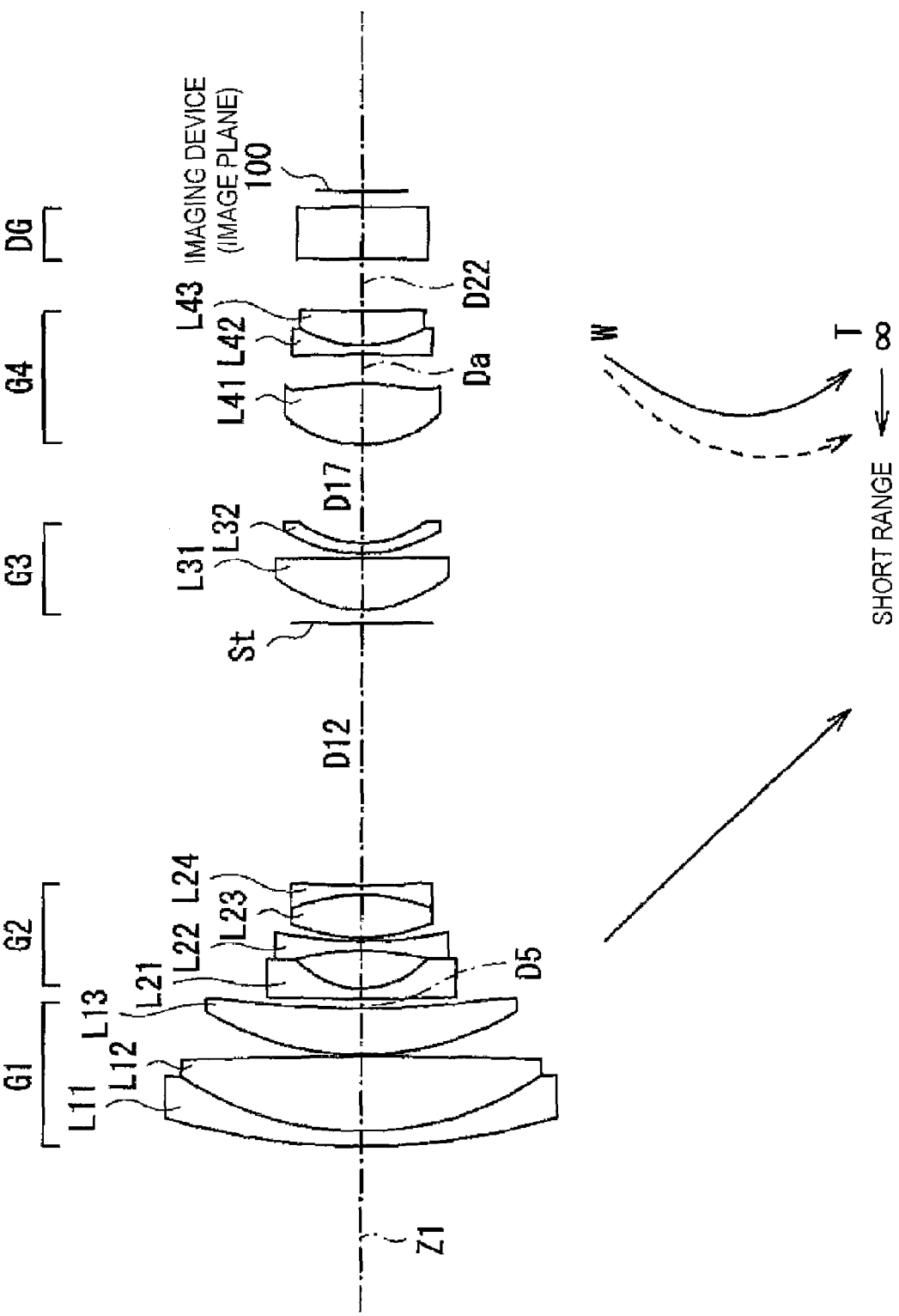
FIG. 2 is a section view illustrating a second example of the structure of the zoom lens according to the embodiment of the invention, which corresponds to Example 2.
Figure 3:
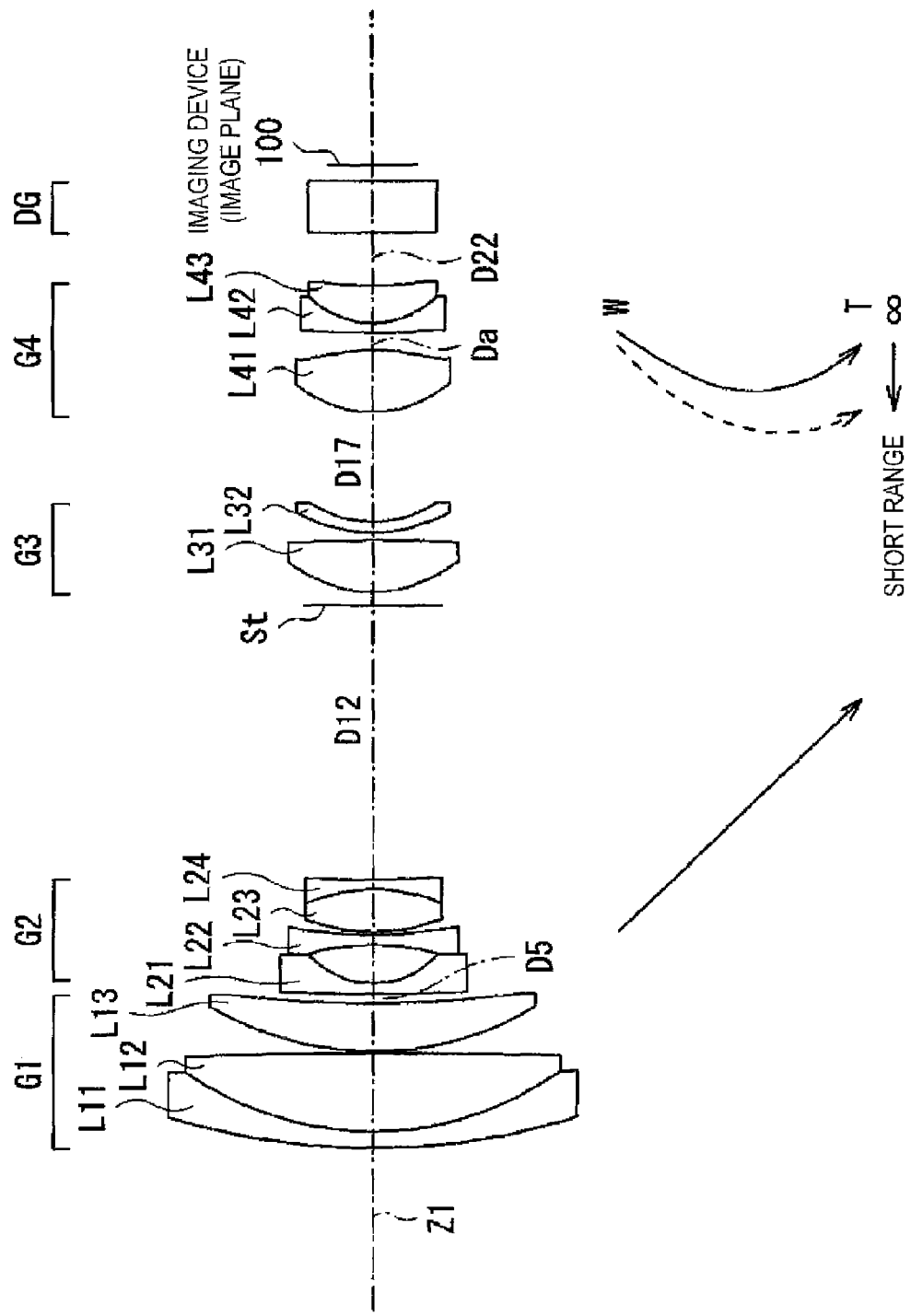
FIG. 3 is a section view illustrating a third example of the structure of the zoom lens according to the embodiment of the invention, which corresponds to Example 3.

FIG. 1 is a diagram illustrating a first example of the structure of a zoom lens according to an embodiment of the invention. This example corresponds to a lens structure according to a first numerical example (FIGS. 4A, 4B, and 5), which will be described later. Similarly, FIGS. 2 and 3 are section views respectively illustrating second and third examples of the structure of the zoom lens corresponding to second and third numerical examples, which will be described later. FIGS. 1 to 3 show the arrangement of lens elements in a state where the zoom lens focuses on an infinite object at a wide-angle end. In FIGS. 1 to 3, symbol Di denotes a surface spacing between an i-th surface and an (i+1)-th surface on an optical axis Z1. The symbol Di is given to only surface spacings that vary along with zooming.

The zoom lens according to this embodiment is suitable for use in, for example, a video camera and a digital still camera. The zoom lens includes, in order from an object side along the optical axis Z, a first lens group G1 having a positive refractive power, a second lens group G2 having a negative refractive power, a third lens group G3 having a positive refractive power, and a fourth lens group G4 having a positive refractive power. An optical aperture diaphragm St is disposed between the second lens group G2 and the third lens group G3.

Components are disposed on the image side of the zoom lens in accordance with the structure of an imaging section of a camera. For example, an imaging device 100, such as a CCD (charge coupled device) or a CMOS (complementary metal oxide semiconductor), is provided on an image formation surface (imaging surface) of the zoom lens. In addition, optical members DG, such as various optical filters, a cover glass, and a prism, are provided between the last lens group (fourth lens group G4) and the imaging surface. The imaging device 100 outputs electric signals (imaging signals) in accordance with a subject image formed by the zoom lens. An imaging device according to this embodiment includes at least the zoom lens of this embodiment and the imaging device 100.

Figure 20:
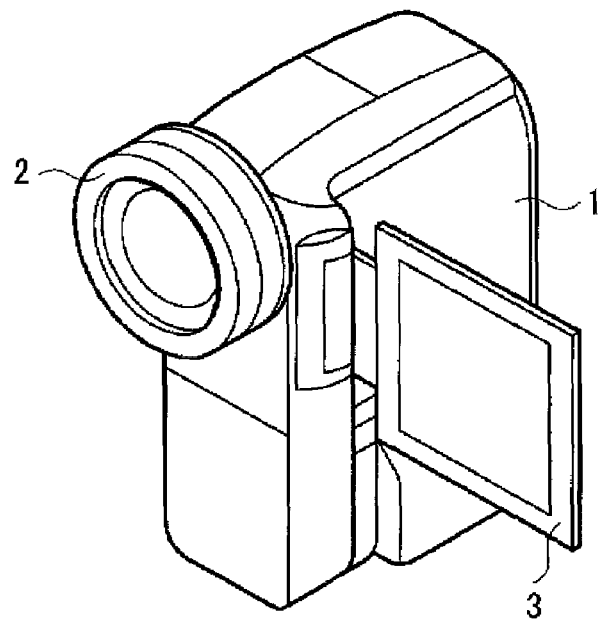
FIG. 20 is a diagram illustrating an example of the structure of a camera including the zoom lens according to the embodiment of the invention.

FIG. 20 is a diagram illustrating an example of a video camera including the zoom lens.

The video camera includes a camera body 1 and a camera lens 2 that is provided in an upper part of the camera body 1. The camera body 1 includes an imaging device, such as a CCD, that outputs imaging signals in accordance with a subject image formed by the camera lens 2, a signal processing circuit that processes the imaging signals output from the imaging device to generate an image, and a recording medium that stores the generated image. A display unit 3 that displays the captured image is attached to the camera body 1. In the video camera having this structure, the zoom lens of this embodiment is used as the camera lens 2.

In the zoom lens, the first lens group G1 is not moved during zooming and during focusing, and includes a plurality of lenses. As shown in FIG. 1, for example, the first lens group G1 includes a cemented lens formed of a negative lens L11 and a positive lens L12, and a positive lens L13.

In the zoom lens, the second lens group G2 and the fourth lens group G4 are magnification changing portions, and are moved during zooming along a locus shown in FIG. 1. That is, the second lens group G2 is moved to the image side along the optical axis Z1 so as to be distant from the first lens group G1 during zooming from the wide-angle end (W) to the telephoto end (T). During zooming from the wide-angle end to the telephoto end, the fourth lens group G4 is moved to the object side along the optical axis Z1, and then moved to the image side so that the locus of the fourth lens group G4 shows an arc shape during zooming. The fourth lens group G4 has a function of correcting a image plane variation caused by zooming. In addition, the fourth lens group G4 is moved during focusing. For the movement of the fourth lens group G4, the arc-shaped locus represented by a solid line in FIG. 1 indicates the locus during zooming with the lens being focused on an infinite object, and the arc-shaped locus represented by a dashed line in FIG. 1 indicates the locus during zooming with the lens being focused on a short-range object.

The fourth lens group G4 includes, in order from the object side, a single positive lens L41 and a cemented lens having a negative refractive power as a whole. The single positive lens L41 has aspheric surfaces on both of the object sides and the image side. The object-side surface of the single positive lens L41 is convex and has a refractive power stronger than that of the image-side surface of the single positive lens L41. The cemented lens is configured by cementing a negative lens L42 and a positive meniscus lens L43 having a convex surface directed to the object side. It is preferable that the fourth lens group G4 satisfies the following conditional expressions:

$$0.04 < Da/f4 < 0.15 \quad (1)$$

$$(n_{41} + n_{43})/2 < 1.53 \quad (2)$$

$$v_{41} > 70 \quad (3)$$

where Da denotes a gap between the single positive lens L41 and the cemented lens, f4 denotes a focal length of the fourth lens group G4, $n_{41}$ denotes a refractive index of the single positive lens L41 at the d-line, $n_{43}$ denotes a refractive index of the positive meniscus lens L43 at the d-line, and $v_{41}$ denotes an Abbe number of the single positive lens L41 at the d-line.

The third lens group G3 includes, in order from the object side, a positive lens L31 having at least one aspheric surface and a negative meniscus lens L32 that has a concave surface directed to the image side. An object-side surface of the positive lens L31 is convex and has a refractive power stronger than that of the image-side surface of the positive lens L31. It is preferable that the third lens group G3 satisfies the following conditional expressions:

$$n_{3N} - n_{3P} > 0.38 \quad (4)$$

$$v_{3N} < 21 \quad (5)$$

where $n_{3N}$ denotes a refractive index of the negative meniscus lens L32 at the d-line, $n_{3P}$ denotes a refractive index of the positive lens L31 at the d-line, and $v_{3N}$ denotes an Abbe number of the negative meniscus lens L32 at the d-line.

The second lens group G2 includes, in order from the object side, a negative lens L21, a negative lens L22 having concave surfaces on both sides and a cemented lens configured by cementing a positive lens L23 having convex surfaces on both sides and a negative lens L24. An image-side surface of the negative lens L21 is concave and has a refractive power stronger than that of an object-side surface of the negative lens L21. It is preferable that the second lens group G2 satisfies the following conditional expression:

$$-1.2 < fw/f2 < -0.85 \quad (6)$$

where fw denotes a focal length of the entire optical system at the wide-angle end, and f2 denotes a focal length of the second lens group G2.

Next, the operations and effects of the zoom lens having the above-mentioned structure will be described.

In the zoom lens, the fourth lens group G4 includes, in order from the object side, the single positive lens L41 having the aspheric surfaces on both of the object side and the image side, and the cemented lens having the negative refractive power as a whole. The object-side surface of the single positive lens L41 is convex and is directed to the object side. The cemented lens is configured by cementing the negative lens L42 and the positive meniscus lens L43 having the convex surface directed to the object side. With this structure, the fourth lens group G4 becomes a moderate telephoto type, and the principal position thereof is moved to the object side. Therefore, it is possible to shorten a distance between the fourth lens group G4 and the image formation surface while ensuring a necessary back focal length. As a result, it is possible to achieve an optical system having a small size and a high performance.

Further, in the zoom lens, the third lens group G3 includes, in order from the object side, the positive lens L31 having the at least one aspheric surface and the negative meniscus lens L32 having the concave surface directed to the object side. The object-side surface of the positive lens L31 is convex and has the refractive power stronger than that of the image-side surface of the positive lens L31. With this structure, the third lens group G3 becomes a telephoto type, and the principal position thereof is moved to the object side. Therefore, it is possible to shorten a distance between the third lens group G3 and the image formation surface.

Furthermore, in this zoom lens, the second lens group G2 includes, in order from the object side, the negative lens L21, the negative lens L22 having the concave surfaces on the both sides, and the cemented lens configured by cementing the positive lens L23 having the convex surfaces on the both sides and the negative lens L24. The image-side surface of the negative lens L21 is the concave surface and has the refractive power stronger than that of the image-side surface of the negative lens L21. With this structure, while an angle of view is increased at the wide-angle end, and a high zoom ratio is achieved, the movement amount of the second lens group G2 in the optical axis direction can be reduced, and the overall length of the zoom lens can be shortened. In addition, the refractive power assigned to each lens is lowered, and the negative Petzval sum is reduced. Thereby, an image plane variation caused by zooming is reduced even with the high zoom ratio. It is possible to improve an optical performance.

The conditional expression (1) defines an appropriate air gap between two lens elements (the single positive lens L41 and the cemented lens) in the fourth lens group G4. If Da/f4 falls below the lower limit of the conditional expression (1), the effect of the telephoto type is reduced, and an excessively long back focal length is obtained, which is not preferable. On the other hand, if Da/f4 exceeds the upper limit of the conditional expression (1), the air gap between the two lens components of the fourth lens group G4 becomes excessively large, which increases the overall length of the fourth lens group G4. When considering movement during zooming and during focusing, a large space is needed between the third lens group G3 and the image formation surface, which makes it difficult to reduce the size of the zoom lens.

The conditional expression (2) defines an average value of the refractive indices of the positive lens components (the signal lens L41 and the meniscus lens L43) in the fourth lens group G4. If $(n_{41}+n_{43})/2$ exceeds the upper limit of the conditional expression (2), the refractive indices of the positive lens components are increased, and the negative Petzval sum of the entire system is increased. As a result, a field curvature is increased, which is not preferable.

The conditional expression (3) defines the Abbe number of the single positive lens L41 of the fourth lens group G4. If the Abbe number of the single positive lens falls below the lower limit of the conditional expression (3), chromatic aberration generated by the fourth lens group G4 is not sufficiently corrected, and the chromatic aberration in the entire zoom range is out of balance.

The conditional expression (4) defines an appropriate combination of the refractive indices of the positive lens L31 and the negative lens L32 in the third lens group G3. If $n_{3N}-n_{3P}$ falls below the lower limit of the conditional expression 4, the refractive index of the positive lens component is increased, while the refractive index of the negative lens component is decreased simultaneously. As a result, the negative Petzval sum of the entire system is increased, and the field curvature is increased.

The conditional expression 5 defines the Abbe number of the negative lens L32 in the third lens group G3. If $v_{3N}$ is larger than the upper limit of the conditional expression 5, chromatic aberration generated by the third lens group G3 is not sufficiently corrected. Therefore, it is difficult to correct longitudinal chromatic aberration in the entire zoom range.

The conditional expression (6) defines the appropriate refractive power of the second lens group G2. If fw/f2 falls below the lower limit of the conditional expression (6), the negative refractive power of the second lens group G2 is increased, which makes it possible to reduce the movement of the second lens group G2 during zooming. However, a large amount of aberration occurs in the second lens group G2, and it is difficult to maintain a high performance in the entire zoom range. On the other hand, if fw/f2 exceeds the upper limit of the conditional expression 6, the negative refractive power of the second lens group G2 becomes too weak, and the movement of the second lens group G2 should be increased in order to obtain a zoom ratio of about 10. As a result, it is difficult to reduce the total length of the lens.

As described above, according to the zoom lens of this embodiment, it is possible to obtain a lens system that has a large angle of view (for example, about 65°) at the wide-angle end, a high zoom ratio (for example, a zoom ratio of 10), a small size, and a high optical performance and is suitable for, for example, a video camera or a digital still camera by appropriately configuring four lens groups having positive, negative, positive, and positive refractive powers in order from the object side. In addition, it is possible to obtain a high-quality image by providing the zoom lens according to this embodiment in an imaging apparatus.

EXAMPLES

Next, specific numerical examples of the zoom lens according to this embodiment will be described. Plural numerical examples will be collectively described below.

Specific lens data corresponding to the structure of the zoom lens shown in FIG. 1 are shown in FIGS. 4A, 4B, and 5 as Example 1. In particular, FIG. 4A shows the basis lens data of the zoom lens. In the zoom lens according to Example 1, the surface of a component closest to the object side is referred to as a first surface, and the surface number is increased one by one as it is close to the image side. In the lens data of FIG. 4A, a number indicating an i-th surface is shown in a surface number (Si) column. The curvature radius (mm) of the i-th surface from the object side is shown in a curvature radius (Ri) column. Similarly, a gap (mm) between the i-th surface Si and the (i+1)-th surface Si+1 from the object side on the optical axis is shown in a surface spacing (Di) column. A refractive index of a j-th optical component from the object side at the d-line (wavelength: 587.6 nm) is shown in an ndj column. The Abbe number of the j-th optical component from the object side at the d-line is shown in a vdj column.

In addition to the above-mentioned data, FIG. 4A shows paraxial focal lengths f (mm), F numbers (FNO.), and angle of views 2ω of the entire system at the wide-angle end, an intermediate focal length, and the telephoto end.

In the zoom lens according to Example 1, since the second lens group G2 and the fourth lens group G4 are moved on the optical axis during zooming, values of the surface spacings D5, D12, D17, and D22 between the lens groups are variable. FIG. 4B shows values of the surface spacings D5, D12, D17, and D22 at the wide-angle end, the intermediate focal length, and the telephoto end as data of variable surface spacings during zooming.

In the lens data shown in FIG. 4A, symbol * on the left side of the surface number indicates that the related lens surface is an aspheric surface. In the zoom lens according to Example 1, an object-side surface S14 of the positive lens L31 in the third lens group G3 and both surfaces S18 and S19 of the single positive lens L41 in the fourth lens group G4 are aspheric surfaces. In the basis lens data shown in FIG. 4A, numerical values of the curvature radiuses near the optical axis are shown as the curvature radiuses of the aspheric surfaces.

FIG. 5 shows aspheric surface data of the zoom lens according to Example 1. In the numerical values represented as the aspheric surface data, "E" indicates an exponent when 10 is used as the base, and the value represented by an exponential function having 10 as the base is multiplied by a value before "E". For example, "1.0 E-02" represents "$1.0 \times 10^{-2}$".

Values of aspheric surface coefficients $A_n$ and K in the following aspheric surface expression (A) are shown as the aspheric surface data of the zoom lens according to Example 1

$$Z = h^2 \cdot R^{-1}/\{1+(1-K \cdot h^2 \cdot R^{-2})^{1/2}\} + \Sigma A_n \cdot h^n \quad (A)$$

(n is an integer that is greater than or equal to 3), where Z denotes a depth (mm) of an aspheric surface in the optical axis direction, h denotes a distance (height) (nun) from the optical axis to the lens surface, K denotes an eccentricity, R denotes a paraxial curvature radius (mm), and $A_n$ denotes an n-order aspheric surface coefficient.

Specifically, Z indicates a length (mm) of a vertical line that is drawn from a point on an aspheric surface at a height h from the optical axis to the tangent plane of a vertex of the aspheric surface (plane vertical to the optical axis).

The zoom lens according to Example 1 is represented by effectively using $A_3$ to $A_{16}$ as the aspheric surface coefficient $A_n$.

Similar to Example 1, specific lens data according to Example 2 corresponding to the structure of the zoom lens shown in FIG. 2 is shown in FIGS. 6A, 6B, and 7. Similarly, specific lens data according to Example 3 corresponding to the structure of the zoom lens shown in FIG. 3 is shown in FIGS. 8A, 8B, and 9. In the zoom lenses according to Examples 2 and 3, similar to Example 1, the second lens group G2 and the fourth lens group G4 are moved on the optical axis during zooming. Therefore, values of the surface spacings D5, D12, D17, and D22 between the lens groups are variable. Similar to Example 1, the object-side surface S14 of the positive lens L31 in the third lens group G3 and both surfaces S18 and 819 of the single positive lens L41 in the fourth lens group G4 are aspheric surfaces.

FIG. 10 shows values relating to the above-mentioned conditional expressions, according to Examples. As shown in FIG. 10, the values according to Examples are within the numerical ranges of the conditional expressions.

Figure 13:
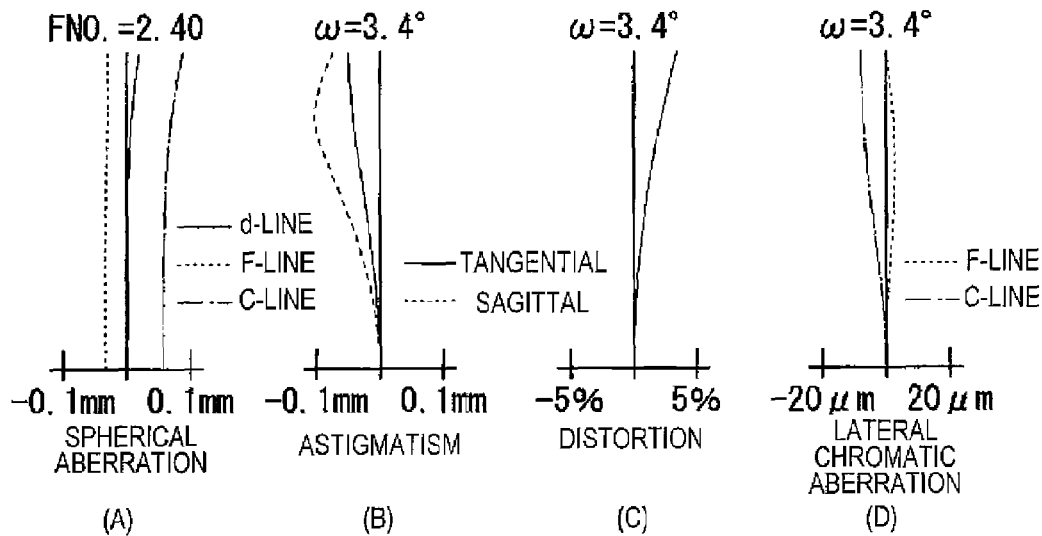
FIG. 13 is an aberration diagrams illustrating spherical aberration, astigmatism, distortion, and lateral chromatic aberration of the zoom lens according to Example 1 at a telephoto end, in which (A) shows the spherical aberration, (B) shows the astigmatism, (C) shows the distortion, and (D) shows the lateral chromatic aberration.

FIG. 11 shows spherical aberration, astigmatism, distortion, and lateral chromatic aberration when the zoom lens according to Example 1 is focused on an infinite object at the wide-angle end. Each of the aberration diagrams shows aberration when the d-line is used as a reference wavelength. The spherical aberration diagram shows aberration at the F-line (wavelength: 486.1 nm) and the C-line (wavelength: 656.3 nm). The lateral chromatic aberration diagram shows aberration at the F-line and the C-line. In the astigmatism, a solid line indicates aberration in a sagittal direction, and a dashed line indicates aberration in a tangential direction. FNO. indicates an F number, and ω indicates a half angle of view. Similarly, FIG. 12 shows spherical aberration, astigmatism, distortion, and lateral chromatic aberration when the zoom lens according to Example 1 is focused on an infinite object at the intermediate focal length, respectively. Similarly, FIG. 13 shows spherical aberration, astigmatism, distortion, and lateral chromatic aberration when the zoom lens according to Example 1 is focused on an infinite object at the telephoto end, respectively.

Figure 14:
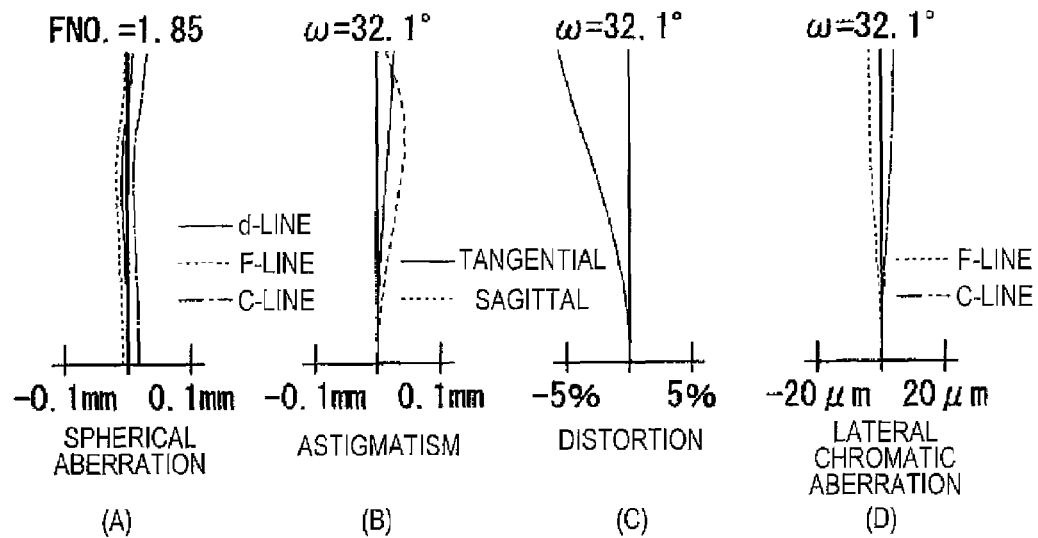
FIG. 14 is an aberration diagram illustrating spherical aberration, astigmatism, distortion, and lateral chromatic aberration of the zoom lens according to Example 2 at a wide-angle end, in which (A) shows the spherical aberration, (B) shows the astigmatism, (C) shows the distortion, and (D) shows the lateral chromatic aberration.
Figure 15:
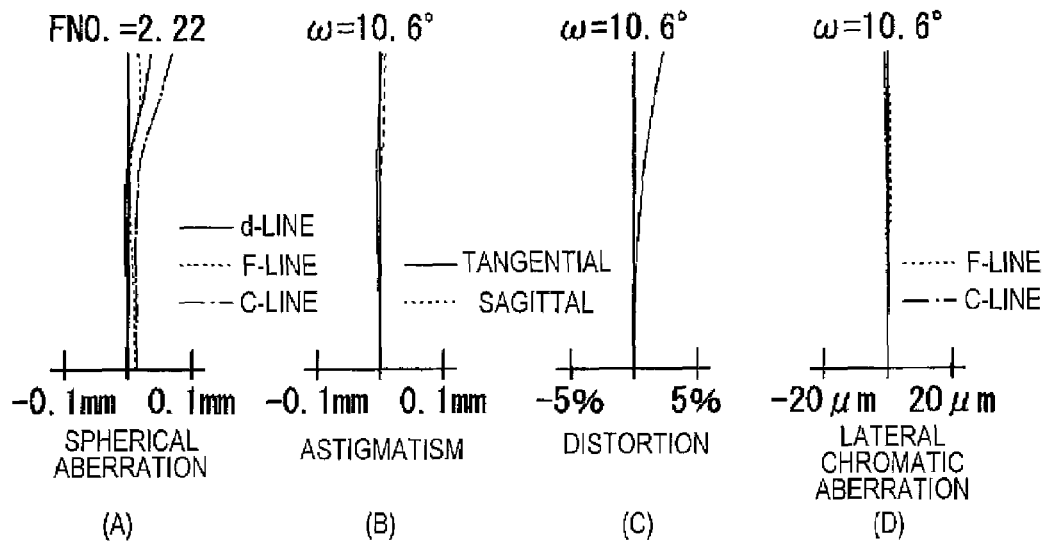
FIG. 15 is an aberration diagram illustrating spherical aberration, astigmatism, distortion, and lateral chromatic aberration of the zoom lens according to Example 2 at an intermediate focal length, in which (A) shows the spherical aberration, (B) shows the astigmatism, (C) shows the distortion, and (D) shows the lateral chromatic aberration.
Figure 16:
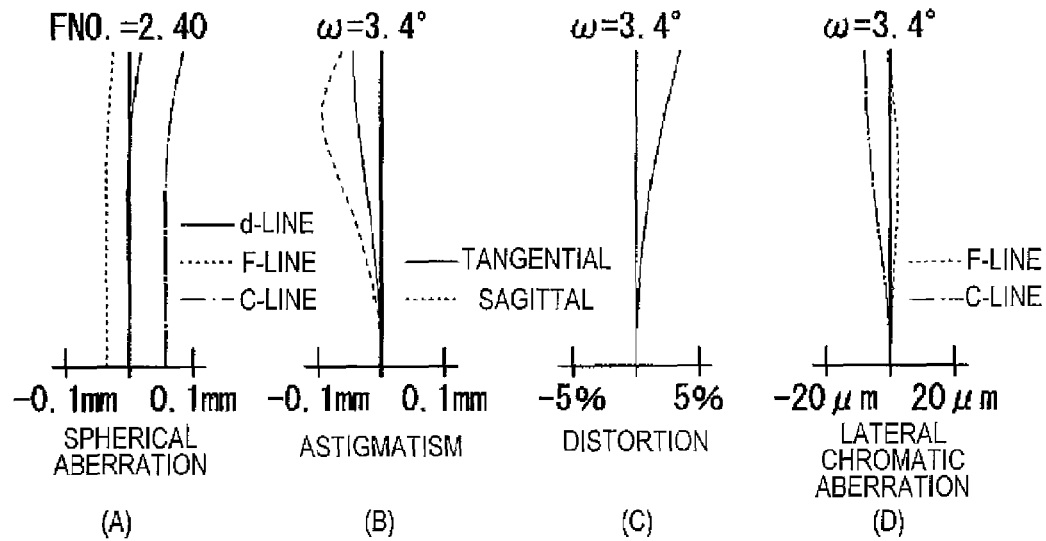
FIG. 16 is an aberration diagram illustrating spherical aberration, astigmatism, distortion, and lateral chromatic aberration of the zoom lens according to Example 2 at a telephoto end, in which (A) shows the spherical aberration, (B) shows the astigmatism, (C) shows the distortion, and (D) shows the lateral chromatic aberration.

Similarly, FIG. 14 shows spherical aberration, astigmatism, distortion, and lateral chromatic aberration when the zoom lens according to Example 2 is focused on an infinite object at the wide-angle end, respectively. Similarly, FIG. 15 shows spherical aberration, astigmatism, distortion, and lateral chromatic aberration when the zoom lens according to Example 2 is focused on an infinite object at the intermediate focal length, respectively. Similarly, FIG. 16 shows spherical aberration, astigmatism, distortion, and lateral chromatic aberration when the zoom lens according to Example 2 is focused on an infinite object at the telephoto end, respectively.

Figure 17:
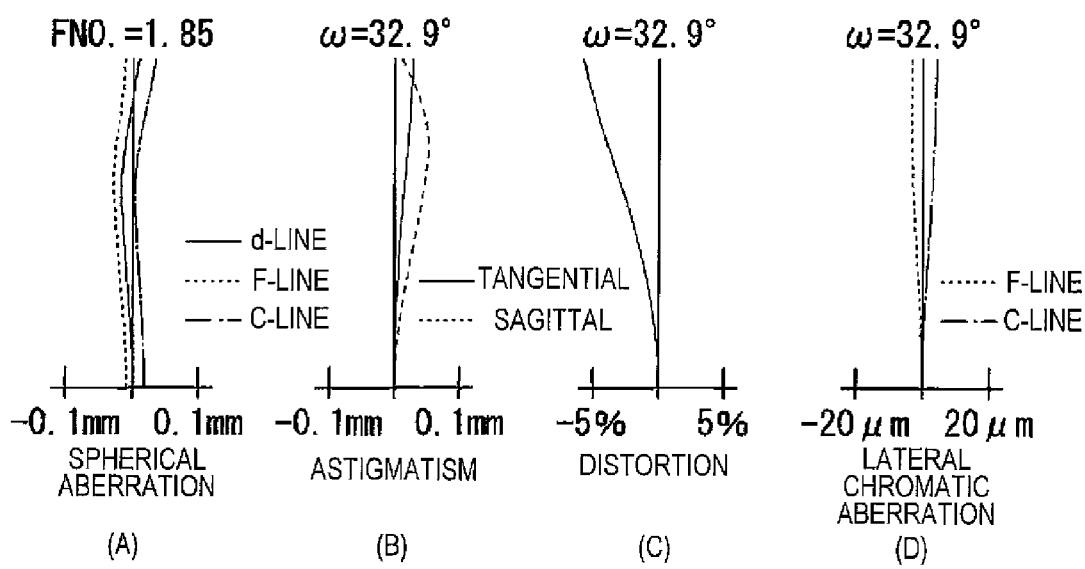
FIG. 17 is an aberration diagram illustrating spherical aberration, astigmatism, distortion, and lateral chromatic aberration of the zoom lens according to Example 3 at a wide-angle end, in which (A) shows the spherical aberration, (B) shows the astigmatism, (C) shows the distortion, and (D) shows the lateral chromatic aberration.
Figure 18:
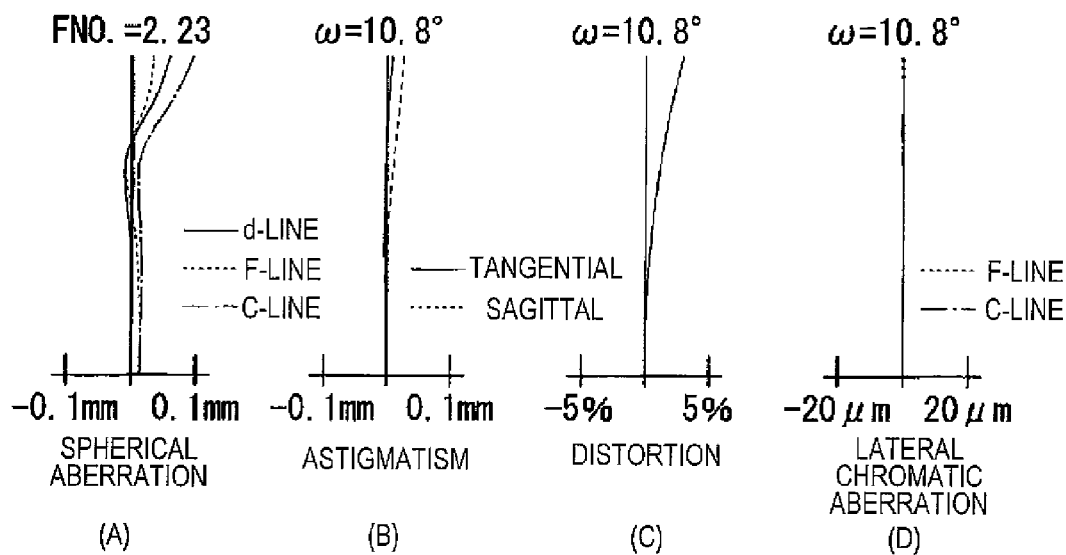
FIG. 18 is an aberration diagram illustrating spherical aberration, astigmatism, distortion, and lateral chromatic aberration of the zoom lens according to Example 3 at an intermediate focal length in which (A) shows the spherical aberration, (B) shows the astigmatism, (C) shows the distortion, and (D) shows the lateral chromatic aberration.
Figure 19:
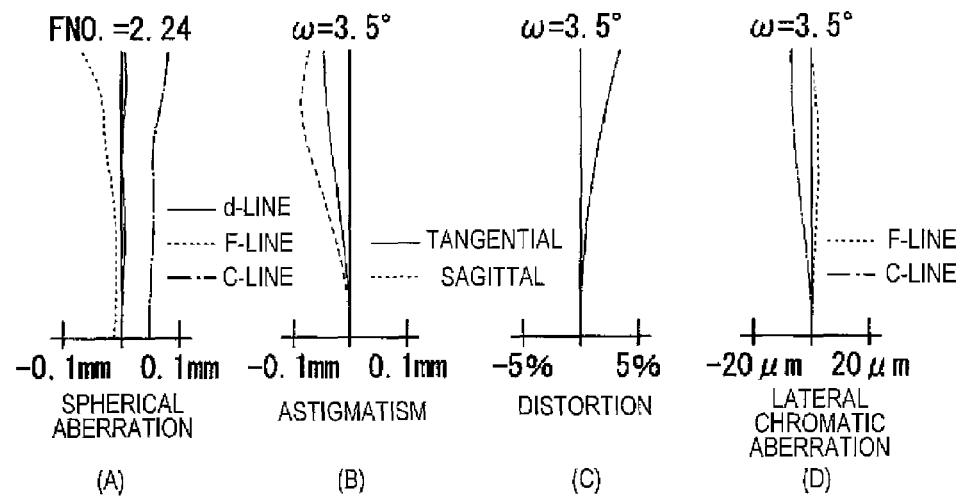
FIG. 19 is an aberration diagram illustrating spherical aberration, astigmatism, distortion, and lateral chromatic aberration of the zoom lens according to Example 3 at a telephoto end in which (A) shows the spherical aberration, (B) shows the astigmatism, (C) shows the distortion, and (D) shows the lateral chromatic aberration.

Similarly, FIG. 17 shows spherical aberration, astigmatism, distortion, and lateral chromatic aberration when the zoom lens according to Example 3 is focused on an infinite object at the wide-angle end, respectively. Similarly, FIG. 18 shows spherical aberration, astigmatism, distortion, and lateral chromatic aberration when the zoom lens according to Example 3 is focused on an infinite object at the intermediate focal length, respectively. Similarly, FIG. 19 shows spherical aberration, astigmatism, distortion, and lateral chromatic aberration when the zoom lens according to Example 3 is focused on an infinite object at the telephoto end, respectively.

As can be seen from the above-mentioned numerical data and aberration diagrams, according to Examples 1 to 3, it is possible to achieve a zoom lens having a large angle of view 2 ω of about 65° at the wide-angle end, a high zoom ratio of about 10, a small size, and a high optical performance.

The invention is not limited to the above-described embodiment and Examples, but various modifications and changes of the invention can be made without departing from the scope and spirit of the invention. For example, the curvature radius, the surface spacings between the lens surfaces, and the refractive index of each lens component are not limited to the values represented by the above-mentioned numerical examples, but other values may be used.

What is claimed is:

1. A zoom lens comprising, in order from an object side:

a first lens group having a positive refractive power;

a second lens group having a negative refractive power;

a third lens group having a positive refractive power; and a fourth lens group having a positive refractive power, wherein the first lens group and the third lens group are fixed during zooming, the second lens group is moved during the zooming, the fourth lens group is moved during zooming and during focusing, the fourth lens group includes, in order from the object side, a single positive lens having aspheric surfaces on both of the object side and an image side, the object-side surface of the single positive lens being convex and having a refractive power stronger than that of the image-side surface of the single positive lens, and a cemented lens having a negative refractive power as a whole, the cemented lens formed of a negative lens and a positive meniscus lens that has a convex surface directed to the object side, the following conditional expressions are satisfied:

$$0.04 < Da/f4 < 0.15 \tag{1}$$

$$(n_{41}+n_{43})/2 < 1.53 \tag{2}$$

where Da denotes a gap between the single positive lens and the cemented lens in the fourth lens group, f4 denotes a focal length of the fourth lens group, $n_{41}$ denotes a refractive index of the single positive lens in the fourth lens group at the d-line, and $n_{43}$ denotes a refractive index of the positive meniscus lens in the fourth lens group at the d-line.

2. The zoom lens according to claim 1, wherein the single positive lens in the fourth lens group satisfies the following conditional expression:

$$v_{41} > 70 \tag{3}$$

where $v_{41}$ denotes an Abbe number of the single positive lens in the fourth lens group at the d-line.

3. The zoom lens according to claim 2, wherein the third lens group includes, in order from the object side, a positive lens having at least one aspheric surface, an object-side surface of the positive lens being convex and having a refractive power stronger than that of an image-side surface of the positive lens, and a negative meniscus lens having a concave surface directed to the image side, and the third lens group satisfies the following conditional expression:

$$n_{3N} - n_{3P} > 0.38 \quad (4)$$

$$v_{3N} < 21 \quad (5)$$

where $n_{3N}$ denotes a refractive index of the negative meniscus lens in the third lens group at the d-line, $n_{3P}$ denotes a refractive index of the positive lens in the third lens group at the d-line, and $v_{3N}$ denotes an Abbe number of the negative meniscus lens in the third lens group at the d-line.

4. An imaging apparatus comprising:
the zoom lens according to claim 3; and
an imaging device that outputs imaging signals in accordance with an optical image formed by the zoom lens.

5. The zoom lens according to claim 3, wherein
the second lens group includes, in order from the object side,
a negative lens, an image-side surface of the negative lens being a concave surface and having a refractive power stronger than that of an object-side surface of the negative lens,
a negative lens having concave surfaces on both sides, and
a cemented lens formed of a positive lens having convex surfaces on both sides and a negative lens, and
the following conditional expression is further satisfied:

$$-1.2 < fw/f2 < -0.85 \quad (6)$$

where fw denotes a focal length of the entire optical system at the wide-angle end, and
f2 denotes a focal length of the second lens group.

6. An imaging apparatus comprising:
the zoom lens according to claim 5; and
an imaging device that outputs imaging signals in accordance with an optical image formed by the zoom lens.

7. The zoom lens according to claim 2, wherein
the second lens group includes, in order from the object side,
a negative lens, an image-side surface of the negative lens being a concave surface and having a refractive power stronger than that of an object-side surface of the negative lens,
a negative lens having concave surfaces on both sides, and
a cemented lens formed of a positive lens having convex surfaces on both sides and a negative lens, and
the following conditional expression is further satisfied:

$$-1.2 < fw/f2 < -0.85 \quad (6)$$

where fw denotes a focal length of the entire optical system at the wide-angle end, and
f2 denotes a focal length of the second lens group.

8. An imaging apparatus comprising:
the zoom lens according to claim 7; and
an imaging device that outputs imaging signals in accordance with an optical image formed by the zoom lens.

9. An imaging apparatus comprising:
the zoom lens according to claim 2; and
an imaging device that outputs imaging signals in accordance with an optical image formed by the zoom lens.

10. The zoom lens according to claim 1, wherein
the third lens group includes, in order from the object side,
a positive lens having at least one aspheric surface, an object-side surface of the positive lens being convex and having a refractive power stronger than that of an image-side surface of the positive lens, and
a negative meniscus lens having a concave surface directed to the image side, and
the third lens group satisfies the following conditional expression:

$$n_{3N} - n_{3P} > 0.38 \quad (4)$$

$$v_{3N} < 21 \quad (5)$$

where $n_{3N}$ denotes a refractive index of the negative meniscus lens in the third lens group at the d-line, $n_{3P}$ denotes a refractive index of the positive lens in the third lens group at the d-line, and $v_{3N}$ denotes an Abbe number of the negative meniscus lens in the third lens group at the d-line.

11. An imaging apparatus comprising:
the zoom lens according to claim 10; and
an imaging device that outputs imaging signals in accordance with an optical image formed by the zoom lens.

12. The zoom lens according to claim 10, wherein
the second lens group includes, in order from the object side,
a negative lens, an image-side surface of the negative lens being a concave surface and having a refractive power stronger than that of an object-side surface of the negative lens,
a negative lens having concave surfaces on both sides, and
a cemented lens formed of a positive lens having convex surfaces on both sides and a negative lens, and
the following conditional expression is further satisfied:

$$-1.2 < fw/f2 < -0.85 \quad (6)$$

where fw denotes a focal length of the entire optical system at the wide-angle end, and
f2 denotes a focal length of the second lens group.

13. An imaging apparatus comprising:
the zoom lens according to claim 12; and
an imaging device that outputs imaging signals in accordance with an optical image formed by the zoom lens.

14. The zoom lens according to claim 1, wherein
the second lens group includes, in order from the object side,
a negative lens, an image-side surface of the negative lens being a concave surface and having a refractive power stronger than that of an object-side surface of the negative lens,
a negative lens having concave surfaces on both sides, and
a cemented lens formed of a positive lens having convex surfaces on both sides and a negative lens, and
the following conditional expression is further satisfied:

$$-1.2 < fw/f2 < -0.85 \quad (6)$$

where fw denotes a focal length of the entire optical system at the wide-angle end, and f2 denotes a focal length of the second lens group.

15. An imaging apparatus comprising:
the zoom lens according to claim 14; and
an imaging device that outputs imaging signals in accordance with an optical image formed by the zoom lens.

16. An imaging apparatus comprising:
the zoom lens according to claim 1; and
an imaging device that outputs imaging signals in accordance with an optical image formed by the zoom lens.

* * * * *